Patented Dec. 7, 1943

2,336,230

UNITED STATES PATENT OFFICE 2,336,230

SURFACE-ACTIVE AGENT

Joseph B. Dickey and Anthony Loria, Rochester, N. Y., assignors to Eastman Kodak Company, Rochester, N. Y., a corporation of New Jersey No Drawing. Application August 15, 1941, Serial No. 407,066

1 Claim. (Cl. 260—457)

This invention relates to the preparation and use of new organic compounds useful as surface-active agents and more particularly to derivatives of phosphonic acids having high chemical stability and inertness to hard water.

The principal object of the invention is the production of a new class of organic chemical compounds which are useful as surface-active agents such as wetting agents, dispersing or emulsifying agents, penetrating agents, detergents and the like. A further object is to provide compounds which are useful as textile lubricants and anti-statics. A still further object is to provide a new class of derivatives of phosphonic acid. Other objects will appear hereinafter.

We have found that phosphonic acids having the general formula (A) 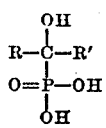

and (B) 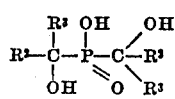

wherein R, R', R² and R³ are substituents selected from the group consisting of hydrogen, alkyl, aryl, naphthenyl, alkaryl and heterocyclic groups, when reacted with suitable sulfating agents give compounds having the formulae (I) 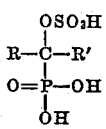

(II) 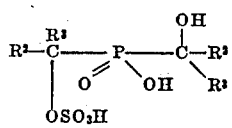

and (III) 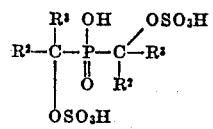

which are useful for the above-mentioned purposes and constitute new chemical compounds.

The carbinol group of II can be acylated, alkylated, phosphated, etc., if desired. Acids of types I, II, and III can be wholly or partially neutralized with any desired organic or inorganic base such as, for example, sodium hydroxide, potassium hydroxide, calcium hydroxide, magnesium hydroxide, ammonium, tetramethylammonium hydroxide, triethylcetylammonium hydroxide, trimethylbenzylammonium hydroxide, tributyltetrahydrofurfurylammonium hydroxide, mono-, di- and tri-ethanolamine, amylamine, oleylamine, naphthenylamine, tetrahydrofurfurylamine, ditetrahydrofurfurylamine, diethyltetrahydrofurfurylamine, diethylcyclohexylamine, beta-hydroxy-beta-ethoxy-beta-ethoxyethylamine, ethylenediamine, morpholine, piperazine, benzylamine, etc. In the preparation of these salts one or more bases may be used.

The intermediates used may be prepared as described in Friend's "Textbook of Inorganic Chemistry," II, Part III, Chapter 1; J. Am. Chem. Soc., 43, 1928; ibid, 44, 2530; Compt. rend., 134, 847; Ann. chim. phys. (8) 3, 347; Comp. rend., 136, 234; ibid., 133, 219; and in the following U. S. Patents Nos. 2,279,501, 2,279,502, 2,286,792.

The acids (A) and (B) are sulfated by reacting with a sulfating agent such as oleum, sulfuric acid, sulfur trioxide, pyrosulfuric acid, dioxanesulfur trioxide complex, chlorosulfonic acid, sulfuryl chloride, sulfamidyl chloride, etc. These reactions may be carried out in a solvent.

The products of this invention give calcium and magnesium salts which are sufficiently soluble in water to enable one to use these compounds in hard water without the formation of the objectionable precipitates obtained with soap. Because of this property many of the products of this invention are valuable for many household purposes, such as the cleansing of cloth, dishes, and the like. The products of this invention can also be used with advantage for practically any purpose where a "surface-active" compound is needed; for example, as dispersing, wetting, emulsifying, and cleansing agents, as textile assistants, and dye-dispersing agents. The products of this invention are of especial value for lubricating textiles and are particularly valuable for use on textiles including cellulose acetate where an antistatic agent is required.

In the following examples and description, we have included several of the preferred embodiments of our invention, but they are included merely for purpose of illustration and not as a limitation thereof.

PREPARATION OF THE COMPOUNDS

Example 1

One mole of 2-hydroxyheptane phosphinate-2 is placed in a flask fitted with a stirrer and dropping funnel and one mole of chlorosulfonic acid is added dropwise with stirring. Hydrogen chloride is evolved and the reaction is completed by warming. Water is then added and any mono, di, or tri salt desired is prepared by adding the required amount of base. The 2-sulfatoheptane phosphinic acid-2 has the formula

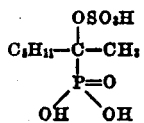

Example 2—2-alpha-sulfatoheptane-2-alpha-hydroxyheptane phosphinic acid

One mole of 2-bis-alpha-hydroxyheptane phosphinic acid is reacted as in Example 1 with one mole of chlorosulfonic acid. The resulting compound, which has the formula

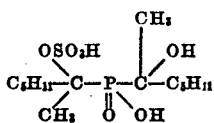

forms a mono or di salt with organic and inorganic bases.

If two moles of chlorosulfonic acid are used bis-2-alpha-sulfatoheptane phosphinic acid is obtained.

Example 3—1 (mixed) xylyl-1-sulfatohexadecyl-1-phosphinic acid sodium salt

One mole of (mixed) 1-xylyl-1-hydroxypentadecyl-1-phosphinic acid is treated as in Example 1 with one mole of sulfuryl chloride. When no more acid chloride is evolved aqueous sodium carbonate is added in sufficient quantity to hydrolyze the acid chloride and form the disodium salt. The product has the formula

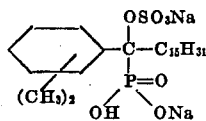

If in place of the above acid chloride phosphorous trichloride or phosphorous oxychloride is used the corresponding phosphate

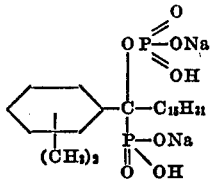

and phosphite

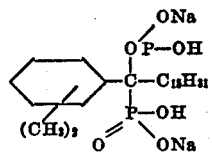

are obtained.

Other compounds of this type which may be prepared by an analogous procedure are the following. The compounds illustrated by these particular formulae are outstanding in their usefulness as surface-active agents in general and for the uses particularly pointed out above.

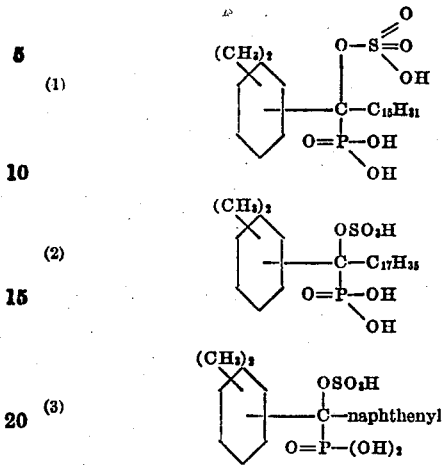

Example 4—1-sulfatohexadecylphosphinic acid-1

One mole of 1-hydroxyhexadecylphosphinic acid-1 is treated in dioxane with dioxane-sulfur trioxide molecular complex. The reaction is completed by warming and, if desired, a primary, secondary, or tertiary salt is prepared. The product has the formula

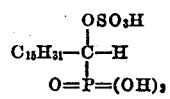

Similarly, bis - alpha - sulfato-1-hexadecylphosphinic acid, having the formula

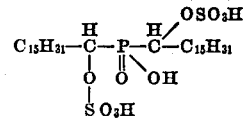

is prepared.

Example 5—Dinaphthenylsulfatomethane phosphinic acid sodium salt

One mole of dinaphthenyl hydroxymethane phosphinic acid is heated in 10% oleum for two hours and then poured onto ice. The mixture is then made alkaline to litmus with sodium carbonate and filtered hot. The compound is precipitated with salt, filtered, and dried. It has the formula

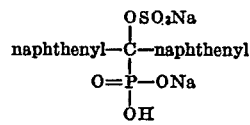

In a similar manner bis-dinaphthenylsulfatomethane phosphinic acid tripotassium salt is obtained:

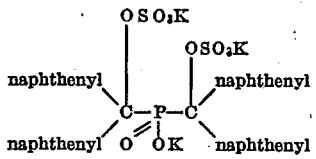

Example 6—Diphenylphosphitonaphthenyl methane phosphinic acid

One mole of diphenylnaphthenylhydroxymethane phosphinate is treated in pyridine in the cold with one mole of phosphorous trichloride and warmed on the steam bath to complete the reaction. Then 1.5 moles of sodium carbonate in water are added and the pyridine is removed under reduced pressure. The reaction product has the formula:

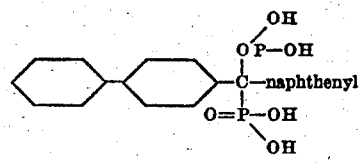

Example 7

One mole of 12-hydroxy-1-carboxyheptadecane phosphinic acid-12 is reacted as in Example 1. The product is 12-sulfato-1-carboxyheptadecane phosphinic acid. If desired the mono, di, and tri esters of glycerine may be prepared from this acid. In place of glycerine any desired carbinol may be used. These esters may be prepared in the reverse manner, that is, by sulfating the esters in place of the free acids. The keto acids needed to prepare the phosphinic acids are prepared as described in U. S. Patent 2,178,760.

Using methods described in Examples 1–7, the following compounds have been prepared:

(1) 2-sulfatohexane phosphinic acid-2

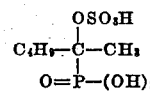

(2) Bis-(2-alpha-sulfatohexane) phosphinic acid

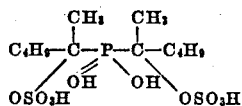

(3) Naphthenylbutylsulfatomethane phosphinic acid

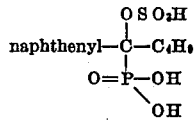

(4) Naphthenyl - γ - ketobutylsulfatomethane phosphinic acid

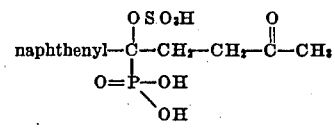

(5) 2,5-disulfatohexane-2,5-diphosphinic acid

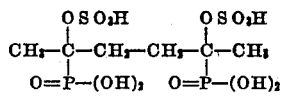

(6) 2-phosphito - 5 - sulfatohexane- 2,5 -diphosphinic acid

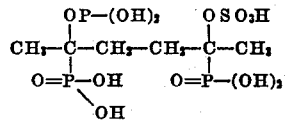

(7) T r i - i s o - propylbenzoheptadecenylsulfato methane phosphinic acid

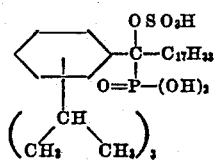

(8) Bis - 1 - alpha - sulfatododecylnaphthalene phosphinic acid

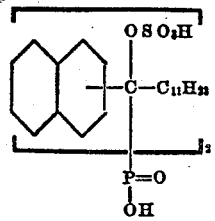

(9) Anthracenylsulfatoheptadecyl methane phosphinic acid

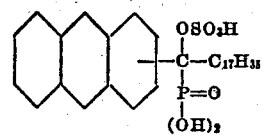

(10) Sulfodibenzofurane s u l f a t o n aphthenyl methane phosphinic acid

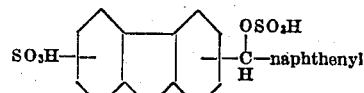

(11) (C e t y l) Acenaphthenylsulfatocyclohexyl-methane sulfinic acid

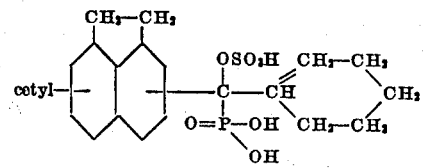

(12) Bis - dicarbazyl - alpha-sulfato-α-hydroxy-tridecylphosphinic acid

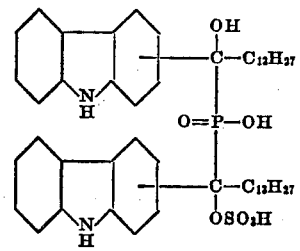

(13) 1-hydroxy phenyl-bis [2,4 hexadecyl-α-sulfato-α sulfinic acid]

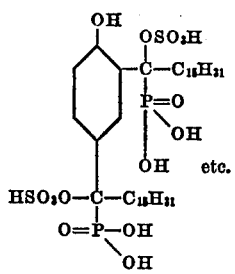

USE OF THE COMPOUNDS AS TEXTILE LUBRICANTS AND ANTI-STATICS

Example 8

The bis-diethylcyclohexylamine salt of 2-sulfatoheptane-2-phosphinic acid

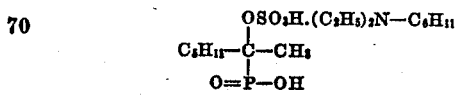

is applied to a textile material such as silk, wool, cotton, viscose, the linear polyamide material sold under the tradename nylon, casein wool, cellulose acetate, and other natural and synthetic materials by means of a wick, bath, roller, spray and the like to render such yarns amenable to knitting, weaving, spinning and the like. The use of this type of lubricant has been found of special value in the preparation of cut staple fibers. The yarns may, if desired, be lubricated with standard lubricants before or after the cutting operation.

Example 9

90–95 parts butyl naphthenate
10–5 parts monosodium monoethanolamine salt of 2 - alpha - sulfato - 2 - alpha-hydroxyheptane phosphinic acid

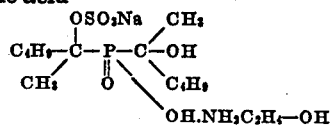

is applied to textile materials such as silk, wool, cotton, viscose, cellulose acetate, etc., as described in Example 8. If the yarn is intended primarily for knitting, the amount of conditioning liquid applied may vary from 2–25% by weight of the yarn and if for weaving, between 1–5% by weight.

Cellulose acetate filaments treated as described above are quite soft and pliable and give improved results in textile operations such as weaving, knitting, etc., and especially in the preparation of cut staple yarn. Other examples of suitable lubricating mixtures having antistatic properties which are used as illustrated in Examples 8 and 9 follow.

Other conditioning liquids particularly useful as an antistatic treatment of cut staple fibers composed of or containing cellulose acetate and other cellulose organic acid esters, and useful for the lubrication, anti-static and other treatment of textile yarns of this type have the composition indicated by the following examples.

Example 10

1–10 parts

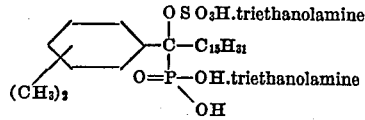

(1(mixed) xylyl-1-sulfatohexadecyl-1-phosphinic acid-bis-triethanolamine salt)

99–90 parts olive oil

Example 11

1–20 parts

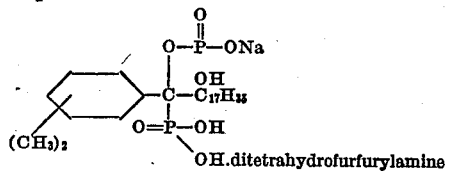

(1)mixed) xylyl-1-phosphatohexadecyl-1-phosphinic acid sodium ditetrahydrofurfurylamine salt)

99–90 parts olive oil

Example 12

1–10 parts

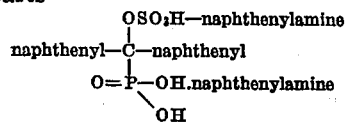

(Dinaphthenylsulfato-methane bis-naphthenylamine salt)

99–90 parts mineral oil

Example 13

10 parts butyl stearate
89–80 parts mineral oil
1–10 parts

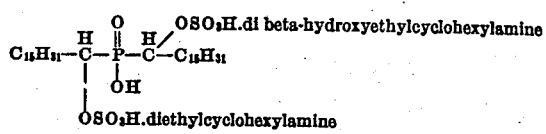

(Bis-alpha-sulfato-1-hexadecylphosphinic acid diethylcyclohexylamine-di-beta-hydroxyethylcyclohexylamine salt)

Example 14

1–10 parts

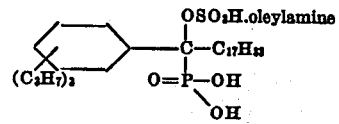

(1-tri-isopropylphenyl-1-sulfato-octadecenylphosphinic acid-1-oleylamine salt)

99–90 parts neat's foot oil

Example 15

99–90 parts blown neat's-foot oil
1–10 parts

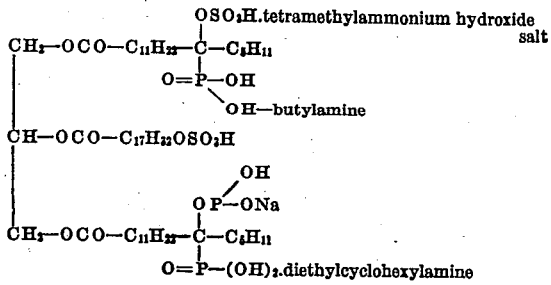

Example 16

55 parts sperm oil
5 parts

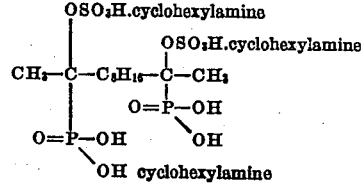

20 parts butyl naphthenate
5 parts

15 parts mineral oil

Example 17

68 parts blown sperm oil
2 parts water
20 parts di-beta-methoxyethylsuccinate
10 parts

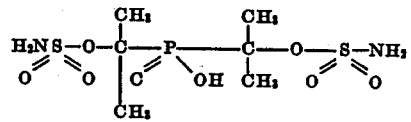

(Bis-2-sulfamate-2-isopropyl-phosphinic acid)

Example 18

1–10 parts

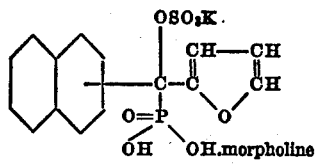

(Naphthylbutylsulfato-methane phosphinic acid potassium morpholine salt)

99–90 teaseed oil

Example 19

1–10 parts

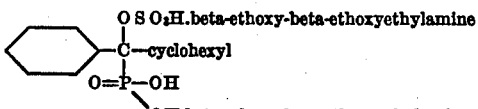

(Phenylcyclohexylsulfato-methane phosphinic acid bis-beta-ethoxy-beta-ethoxyethylamine)

30–40 parts blown olive oil
69–50 parts blown neat's foot oil

Example 20

55–50 parts olive oil
10 parts sulfonated castor oil
20 parts mineral oil
10–15 parts oleic acid
5 parts

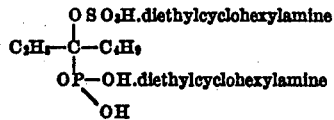

Example 21

70 parts water
15 parts water-soluble cellulose ester
5 parts

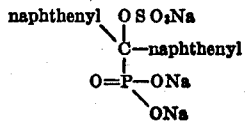

(Dinaphthenylsulfato-methane phosphinic acid trisodium salt)

10 parts sulfonated olive oil

Use of the Compounds as Dye-Dispersing Agents, Dye Assistants and the Like

Example 22

One pound of 1-methylamino-4-ethylamino-anthraquinone is ground with ¼ pound 1-phenyl-1-sulfatohexadecyl phosphinic acid disodium salt,

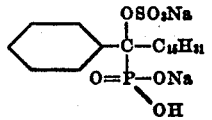

and 3 pounds of sugar in a ball mill. The resulting finely-divided mixture is then added to 100 gallons of water heated to 60–80° and the resulting aqueous suspension of blue dye is used to dye about 100 lbs. of cellulose acetate in any desired manner.

Example 23

One pound of p-nitrobenzeneazo ethyl-beta-hydroxyethyl-aniline is ground in a ball mill with ¼ pound of

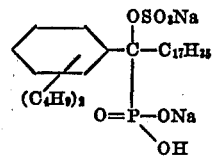

(1-dibutylphenyl-1-sulfatooctadecyl phosphinic acid disodium salt)

and the finely-divided mixture is added to 100 gallons of water heated to 60–80° and used to dye 100 lbs. of cellulose acetate an orange-red shade.

Example 24

One pound of

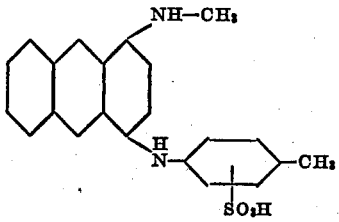

is added to 100 gallons of water containing ¼ pound of

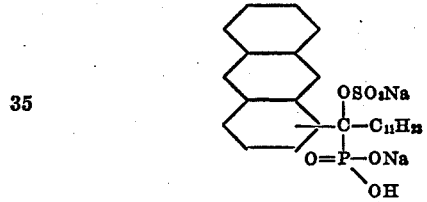

Then 100 pounds of a woolen fabric is entered and dyed at 60–90° level deep blue shades, the fabric being well wetted out.

In addition to the above-mentioned uses, the compounds of our invention are especially effective as detergents for washing textile, china ware, cooking utensils and the like. These compounds may also be employed in place of ordinary soaps for shampooing, shaving and similar applications as well as in tooth paste and other preparations of like character. Their value for these purposes is primarily due to their inertness to hard water and to their chemical stability. Not only may these materials be employed alone, but they may also be employed as an adjunct to other detergent and surface-active agents for many industrial and domestic uses.

What we claim is:

As new chemical compounds derivatives of phosphonic acid having the structural formula

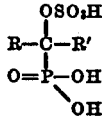

wherein R and R' are substituents selected from the group consisting of hydrogen, alkyl, aryl, naphthenyl, and alkaryl.

JOSEPH B. DICKEY.
ANTHONY LORIA.